(12) United States Patent
Shu et al.

(10) Patent No.: US 11,520,407 B2
(45) Date of Patent: Dec. 6, 2022

(54) VIRTUAL REALITY HAPTIC FEEDBACK INTERACTION SYSTEM

(71) Applicant: South China University of Technology, Guangzhou (CN)

(72) Inventors: Lin Shu, Guangzhou (CN); Qian Peng, Guangzhou (CN); Xiangmin Xu, Guangzhou (CN)

(73) Assignee: South China University of Technology, Guangzhou (CN)

( * ) Notice: Subject to any disclaimer, the term of this patent is extended or adjusted under 35 U.S.C. 154(b) by 16 days.

(21) Appl. No.: 17/263,348

(22) PCT Filed: Oct. 29, 2018

(86) PCT No.: PCT/CN2018/112414
§ 371 (c)(1),
(2) Date: Jan. 26, 2021

(87) PCT Pub. No.: WO2020/019552
PCT Pub. Date: Jan. 30, 2020

(65) Prior Publication Data
US 2021/0149495 A1    May 20, 2021

(30) Foreign Application Priority Data
Jul. 27, 2018  (CN) .......................... 201810852405.6

(51) Int. Cl.
*G06F 3/01* (2006.01)
(52) U.S. Cl.
CPC .............. *G06F 3/016* (2013.01); *G06F 3/011* (2013.01); *G06F 3/012* (2013.01); *G06F 3/014* (2013.01)

(58) Field of Classification Search
CPC .......... G06F 3/016; G06F 3/014; G06F 3/015; G06F 3/011; G06F 3/012; G06F 3/0428;
(Continued)

(56) References Cited

U.S. PATENT DOCUMENTS 10,930,188 B2 *   2/2021   Blank ................... G09G 3/025
11,112,606 B2 *   9/2021   Percival ............... H01L 27/156
(Continued)

FOREIGN PATENT DOCUMENTS

| CN | 105498091 A | 4/2016 |
|----|-------------|--------|
| CN | 106371574 A | 2/2017 |
| CN | 107221223 A | 9/2017 |

OTHER PUBLICATIONS

Search Report dated May 6, 2019, Application No. PCT/CN2018/112414.

*Primary Examiner* — Vijay Shankar
(74) *Attorney, Agent, or Firm* — The Dobrusin Law Firm, PC

(57) ABSTRACT

A virtual reality haptic feedback interaction system, comprising a head display module, a storage module, an electrical stimulation device, a time-division multiplexing circuit, and a flexible electrode array connected in sequence. The storage module receives haptic feedback parameters corresponding to virtual scene interaction events, and converts the corresponding haptic feedback parameters into corresponding electrical signals through its drive circuit; the electrical stimulation device controls the output pulse parameters of each electrical stimulation channel according to the received electrical signals. The time-division multiplexing circuit selects the optimal stimulation paradigm for each haptic experience, and outputs the corresponding pulse to the flexible electrode array.

14 Claims, 2 Drawing Sheets

(58) Field of Classification Search
CPC ... G06F 3/04886; G02B 27/01; G02B 27/017; G02B 7/12
See application file for complete search history.

(56) References Cited

U.S. PATENT DOCUMENTS

| | | |
|---|---|---|
| 2016/0260251 A1 | 9/2016 | Stafford et al. |
| 2019/0086669 A1* | 3/2019 | Percival ................. G06F 3/013 |
| 2020/0368616 A1* | 11/2020 | Delamont ............. A63F 13/213 |
| 2021/0043004 A1* | 2/2021 | Richter ................. G06N 3/006 |
| 2021/0201594 A1* | 7/2021 | Morgan ................. G06F 40/14 |
| 2021/0272367 A1* | 9/2021 | Richter ............... G06F 3/04815 |

* cited by examiner

VIRTUAL REALITY HAPTIC FEEDBACK INTERACTION SYSTEM

TECHNICAL FIELD

The present invention relates to virtual reality interaction technology, in particular to a virtual reality haptic feedback interaction system based on flexible electrode arrays and transcutaneous electrical nerve stimulations.

TECHNICAL BACKGROUND

With the development of science and technology, virtual reality technology has been widely used. VR technology has broad prospects especially in games, films and videos, educations, remote controls, medical etc. Virtual reality technology is an advanced human-computer interaction technology that effectively simulates actions of people in natural environment such as seeing, hearing, and moving. Virtual reality technology constructs a virtual environment through computer graphics, and with the help of corresponding hardware means, such as digital gloves, helmet displays or 3D glasses etc., it provides sensory stimulations such as sight, hearing, touch and smell, which may immerse users in the virtual environment, producing a sense of presence in person. Electric haptic feedback interaction technology is a way of haptic perception of virtual reality technology.

At present, VR devices within country and abroad have the following three deficiencies in realizing force feedback interaction: First, the interactive feedback technology that integrates visual and auditory processing has been developed relatively mature, but for vision, force and touch, and even the interactive feedback technology that integrates vision, hearing, and force and touch processing needs to be improved urgently; then, the form of haptic feedback is mostly realized by the way of sensor vibrating the body surface or pressure stimulation, which is not easy to produce effective constraints on the user during human-computer interaction, and the immersion of the virtual scene is greatly reduced; compared to other haptic feedback methods, electro-haptic has great advantages. Electrical stimulation is simple and easy to implement, lightweight and convenient, high energy conversion efficiency, easy to concentrate, and with high resolution, thus the immersion of the virtual scene is greatly enhanced; finally, the traditional force feedback interactive device for the whole body or the upper body has a large module, is inconvenient to wear and has a high cost, and is not suitable for popularization and application.

In fact, the production of human haptic sensation is due to the low-threshold mechanical stimulus receptors in the skin and soft tissues that emit action potentials induced by external stimuli (such as contact, compression, etc.), and are transmitted and compiled by the central nervous system to form a sensory impression composed of various perceived attributes, comprising feelings of roughness, softness, and adhesion etc. The present invention proposes a new haptic feedback interaction system based on the aforementioned physiological principle of somatosensory stimulation of the human body.

SUMMARY OF THE INVENTION

In order to solve the existing problems in the prior art, the present invention proposes a virtual reality haptic feedback interaction system, which is based on flexible electrode arrays and transcutaneous electrical nerve stimulations, and exploiting that virtual reality and different skin haptic receptors having different response frequencies, the skin haptic receptors are stimulated with different pulses, causing them respond separately, to generate haptic feedback effects corresponding to virtual reality scenes, which enhances the user experience in virtual reality scenes. At the same time, the structure and material of the electrode arrays are improved, which enriches the electric stimulation methods and improves the accuracy of electric stimulation, thereby increasing the immersion of the virtual scene.

The present invention adopts the following technical solutions to achieve: a virtual reality haptic feedback interaction system comprising:

a head display module: used to provide a haptic interactive environment in a virtual scene;

a storage module: connected to the head display module, used to store corresponding relationships between different haptic interaction environments and different haptic feedback parameters; the storage module comprises a corresponding drive circuit to generate electrical signals of characterising current virtual scene parameters; the corresponding relationships between different haptic interaction environments and different haptic feedback parameters are corresponding relationships between different electrical signals and different haptic feedback parameters;

an electrical stimulation device equipped with multiple electrical stimulation channels: connected to the storage module, used to, according to different electrical signals received, controls frequency and pulse width parameters of current pulses output by each of the electrical stimulation channels, and outputs the current pulses to a time-division multiplexing circuit;

the time-division multiplexing circuit: connected to the electrical stimulation device, used to receive the corresponding current pulses output by the electrical stimulation device, and by selecting and controlling different output channels, an optimal stimulation paradigm for different haptic receptors is obtained; performs time-spatial pulse width and frequency combinations to the corresponding current pulses, and outputs to a flexible electrode array;

the flexible electrode array: connected to the time-division multiplexing circuit, used to output corresponding electrical stimulation pulses.

In a preferred embodiment, the virtual reality haptic feedback interaction system according to claim 1, characterized in that, the flexible electrode array comprises a substrate and a plurality of contact electrodes arranged on the substrate, each of the contact electrodes is connected to a corresponding electrical stimulation channel; each of the electrical stimulation channels is controlled by the electrical stimulation device to apply currents of different polarities to different contact electrodes; the electrical stimulation channels are configured to be selectable to activate different contact electrodes to form stimulation electric fields of different shapes on a base of the flexible electrode array, thereby generating stimulation areas of different shapes on the flexible electrode array.

In a preferred embodiment, the virtual reality haptic feedback interaction system according to claim 1, characterized in that, the electrical stimulation device controls each of the electrical stimulation channels to output corresponding multi-channel current pulses based on different electrical signals, wherein each of the electrical stimulation channels outputs current pulses by changing their current pulse frequency and fixing their pulse width, or by changing their current pulse width and fixing their frequency. Further, the current pulses may be bipolar positive pulses or may be bipolar negative pulses.

It may be seen from the above technical solutions that the virtual reality haptic feedback interaction system provided by the present invention provides a way for virtual reality interaction devices to realize haptic feedback; compared with the prior art, the present invention has diversified stimulation modes and precise stimulation positions, and that the haptic feedback is more realistic; in addition, the haptic feedback interaction system of the present invention is based on a flexible electrode array and transcutaneous electrical nerve stimulation, may be applied to wearable devices, and has the advantages of lightness, comfort, low cost, and easy preparation.

DESCRIPTION

The present invention will be described in detail below with reference to the figures and specific embodiments. It should be understood that the description of these embodiments is only to enable those skilled in the art to better understand and then implement the present invention, and does not limit the protection scope of the present invention in any way.

Figure 1:
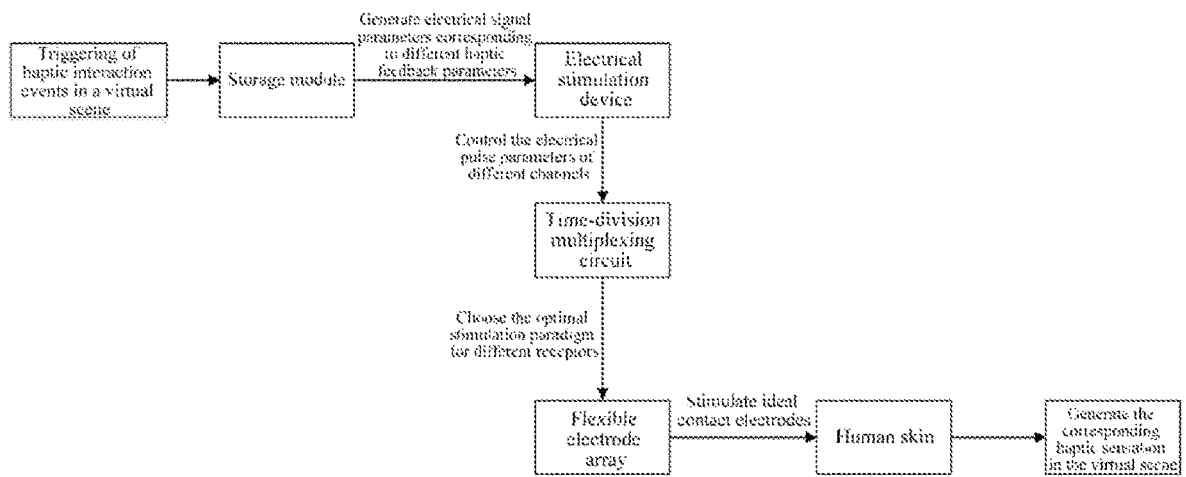
FIG. 1 is a block diagram of the virtual reality haptic feedback interaction system of the present invention.

As shown in FIG. 1, the virtual reality haptic feedback interaction system of the present invention comprises a head display module, a storage module, an electrical stimulation device, a time-division multiplexing circuit, and a flexible electrode array connected in sequence; wherein the head display module is used to provide a haptic interaction environment in a virtual scene such that a haptic interaction event is triggered; the storage module and the head display module are connected in a wired manner to convert different haptic interaction environments into corresponding different electrical signal parameters; the electrical stimulation device is equipped with multiple electrical stimulation channels, according to the different electrical signal parameters received, controls frequency and pulse width parameters of current pulses output by each of the electrical stimulation channels, and outputs the current pulses to a time-division multiplexing circuit to select the optimal stimulation paradigm for different skin receptors; the time-division multiplexing circuit performs time-spatial pulse width and frequency combinations to the corresponding current pulses. The flexible electrode array outputs corresponding electrical stimulation pulses to the fingertips, etc., to stimulate different haptic receptors in the skin to generate nerve impulses, so that the human body may obtain the corresponding haptic sensations in the virtual scene and complete the virtual haptic feedback.

Figure 2:
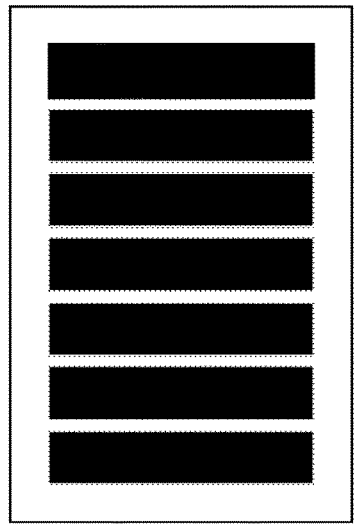
FIG. 2 is a structural diagram of a flexible electrode array of the present invention when the electrodes are of equal size.
Figure 3:
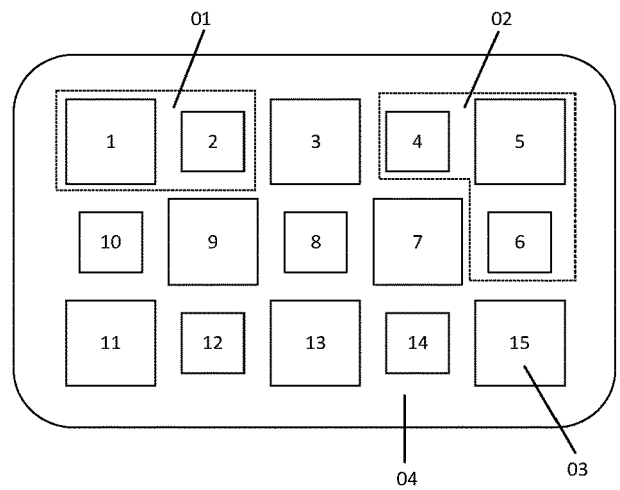
FIG. 3 is a structural diagram of a flexible electrode array of the present invention when the electrodes are not of equal seize.

As shown in FIG. 2 and FIG. 3, the flexible array electrode comprises a substrate and a plurality of flexible dry contact electrodes. The base of the flexible electrode array is made of cloth, and a plurality of flexible dry contact electrodes are attached to the surface of the cloth. The flexible dry contact electrodes are made of flexible conductive fabric materials and are evenly distributed over the entire base. Each contact electrode is connected to a corresponding electrical stimulation channel. Each electrical stimulation channel may be controlled by the electrical stimulation device. By applying currents of different polarities to different contact electrodes, an ideal electrical haptic stimulation effect may be achieved. In other words, each contact electrode is connected to an electrical stimulator (i.e., electrical stimulation device) through a wire through a time-division multiplexing circuit to output electrical stimulation pulses. In addition, the surface of the electrode array is covered with a flexible insulating material with electrode perforations. The insulating material should have a certain thickness (not less than 0.5 mm). The insulating material is provided with electrode perforations, and the electrode perforation should be slightly smaller than the area of the root of the contact electrodes, in order to isolate the charge concentration part of the electrodes from contacting the skin.

The flexible electrode array may be arranged in a square or circular structure at equal intervals for contact with the skin such as fingers and outputs corresponding electrical stimulation pulses; during an electrical stimulation, as the posture of the stimulation location changes, with the cooperation of the electrical stimulation device and the time-division multiplexer, the flexible electrode array may adapt to the change of the stimulation center position and find the ideal stimulation center position again. In this embodiment, the realization process of the flexible electrode adapting to the change of the stimulation center position is specifically: selecting electrical stimulation channels through a control button to activate different contact electrodes to form stimulation electric fields of different shapes on the substrate of the flexible electrode array, to produce stimulation areas of different shapes on the flexible electrode array. As shown in FIG. 3, the electrical stimulation device is controlled to select one of the electrical stimulation channels, and the stimulation pulse is input to contact electrode no. 1 and contact electrode no. 2 to produce an irregular first stimulation area 01; Through selecting another electrical stimulation channel, the stimulation signal is input to contact electrode no. 4 and contact electrode no. 5 to produce an irregular second stimulation area 02; thus two stimulation areas are formed on the substrate, and there is no stimulation signal in the part between the first stimulation area 01 and the second stimulation area 02, and part of the contact electrodes outside the areas will not be stimulated, thus forming two virtual stimulation electrodes of different shapes on the flexible electrode array; at the same time, in the above adaptation process, we may also increase or decrease the stimulation pulses of one or more electrical stimulation channels to change the activated contact electrodes to change the position and size of the virtual electrode (i.e. stimulation area) to achieve dynamic adjustment of the stimulation position and the stimulation range. In this way, even when the posture of the stimulation part changes during exercise training, the best electrical stimulation position may be found, which improves the accuracy of electrical stimulation.

In this embodiment, the size of the contact electrodes of the flexible electrode array may be equal or unequal in size. As shown in FIG. 2, when the sizes of the contact electrodes are equal, it is suitable for finger haptic feedback interaction. The size range of the electrodes is (1-3 mm)*(8-12 mm). This arrangement mode of the contact electrodes adopts an even spacing arrangement, and the electrode spacing is 0.2-1.2 mm; at this time, the electrode may work in three modes, namely:

Mode 1: The electrical stimulator outputs a positive current constant current pulse (i.e., a current pulse) to the flexible electrode array, and only a single contact electrode outputs electrical stimulation pulses to stimulate a single skin receptor.

Mode 2: The electrical stimulator outputs multiple positive current constant current pulses (i.e. multiple current pulses) to the flexible electrode array, and multiple contact electrodes simultaneously output electrical stimulation pulses to stimulate different skin receptors. Mode 2 is the optimal stimulus paradigm for pressure perception.

Mode 3: the electrical stimulation device outputs positive current constant current pulses and adjusts the direction of the current through an isolator, changes current weights of the contact electrodes of the flexible electrode array (maintains a principle that a number of positive and negative current electrodes is variable but sums of currents of the positive and negative current electrodes are equal) to stimulate different skin receptors. Mode 3 is the optimal stimulation paradigm for vibration perception.

As shown in FIG. 3, when the sizes of the contact electrodes are different, it is suitable for the haptic feedback interaction of an arm. The size of the large electrode is (12-14 mm)*(12-14 mm), and the size of the small electrode is (7-9 mm)*(7-9 mm), the contact electrode arrangement mode adopts the arrangement of large and small contact electrodes at an equal interval, and the electrode spacing is 2-6 mm. A stimulation pulse is input to contact electrode no. 1 and contact electrode no. 2 to produce an irregular first stimulation area 01; a stimulation signal is input to contact electrode no. 4 and contact electrode no. 5 to produce an irregular second stimulation area 02; Two stimulation areas are formed on the substrate, and there is no stimulation signal in the part between the first stimulation area 01 and the second stimulation area 02, and the contact electrodes outside the areas will not be stimulated, so the accuracy of the stimulation is improved. Similarly, the third stimulation area 03 (just contact electrode no. 15) and the fourth stimulation area 04 (the entire flexible electrode array) are also formed by the same stimulation method.

Figure 4:
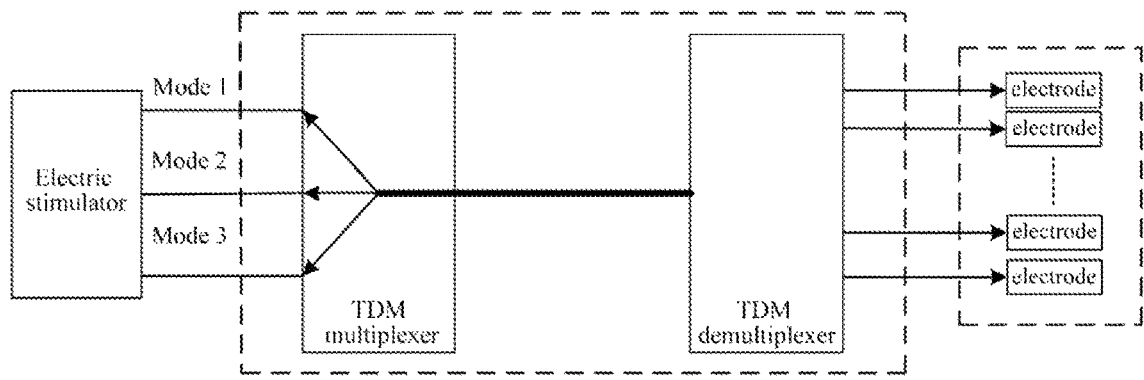
FIG. 4 is a principle block diagram of the time division multiplexing circuit of the present invention.

As shown in FIG. 4, the time-division multiplexing circuit comprises a TDM multiplexer and a TDM demultiplexer that are connected; wherein the TDM multiplexer comprises a synchronous rotary switch, which rotates synchronously according to a certain sampling frequency to sequentially sample input signals. The electric stimulator outputs the current pulses of the above-mentioned mode 1, mode 2, and mode 3 respectively; the time-division multiplexing circuit divides the transmission time of the current pulses of the three modes respectively, so that the current pulses of different modes are transmitted in different time periods, and the optimal vibration and pressure stimulation paradigms for different skin feelings are obtained.

Figure 5:
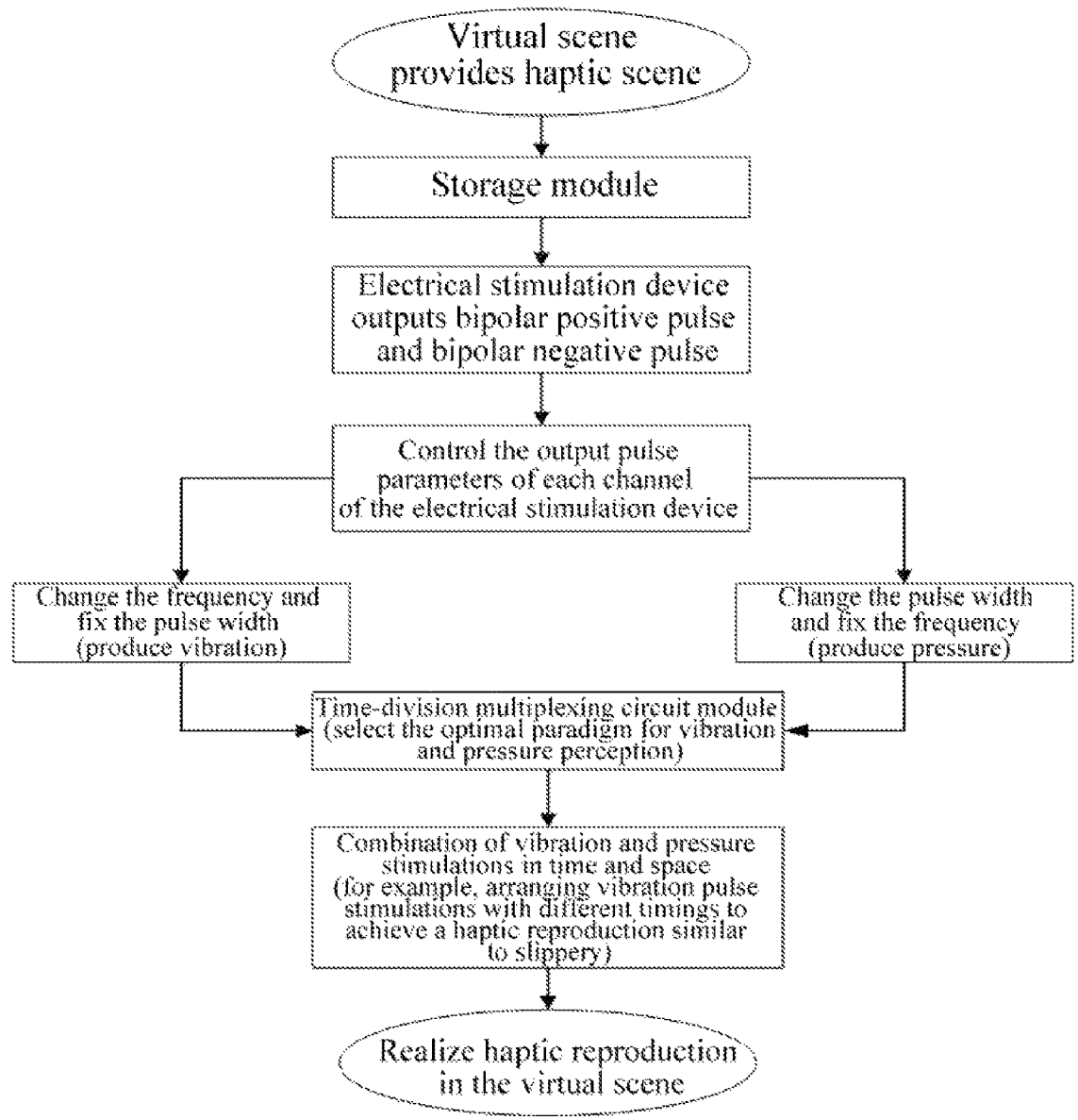
FIG. 5 is a flow chart of the implementation of virtual reality haptic feedback interaction of the present invention.

As shown in FIG. 5, when an experimenter touches different objects in a virtual scene, the different haptic feedback parameters are converted into different electrical signal parameters through the storage module. The electrical stimulation device outputs the corresponding multi-channel current pulses, such as bipolar positive pulses or bipolar negative pulses, based on the different electrical signal parameters; wherein, each electrical stimulation channel may output current pulses by changing their current pulse frequency and fixing their pulse width, or by changing their current pulse width and fixing their frequency, then through the time division multiplexing circuit, the best paradigm of vibration and pressure sensation is selected, and the corresponding vibration and pressure sensation are respectively generated. The current pulse generated by the electrical stimulation device selects the optimal paradigm of vibration and pressure sensation through the time-division multiplexing circuit in order to obtain the best haptic feedback effect. Further, the haptic reproduction of slippery and roughness in the virtual scene is realized through the combined vibration and pressure stimulation in time-space.

In the following, taking virtual slippery feedback as an example, the working process of the present invention is described in detail. The working process of the present invention comprises the following steps:

1. Connect the various modules of the virtual reality haptic feedback interaction system of the present invention, fix a piece of flexible electrode array to a middle finger tip, and attach another piece of flexible electrode array to the back of a hand as the positive and negative electrodes of electrical stimulation pulse input.

2. The haptic interaction environment in the virtual scene is generated through the head display module; the storage module receives the corresponding haptic scene, which is processed by the drive circuit to convert it into a corresponding electrical signal to transmit electrical stimulation pulse signals to the electrical stimulators.

3. After the electrical stimulators receive the electrical stimulation pulse signals, output to the time division multiplexing circuit the corresponding electrical stimulation pulses with fixed pulse width, pulse frequency increased by a fixed step length, or with pulse frequency fixed, pulse width increased by a fixed step length.

4. The time division multiplexing circuit is connected to the flexible electrode array, and transmits electrical stimulation pulses to the skin through the contact electrodes in the flexible electrode array. The electrical stimulation device outputs current pulses in three modes. The transmission time of the current pulses of the three modes is divided by the time division multiplexing circuit, so that the current pulses of the three modes are transmitted in different time periods, and then by controlling the interruption of the synchronous rotary switch, the corresponding control and selection of three different modes of current pulse stimulation are realised during an electrical haptic stimulation process to obtain the optimal vibration and pressure sensation stimulation paradigm required by different haptic sensations.

For example, for slippery, after the skin receptor receives the optimal electrical stimulation response, we may arrange different vibration pulse stimulations in the time sequence by keeping the space unchanged, that is, by controlling the synchronous rotary switch of the time-division multiplexing circuit, the sampling selection of the electrical stimulation pulse mode is performed according to a certain sampling frequency, so that the skin is always in the optimal stimulation paradigm of vibration perception; at the same time, cyclic stimulation is sequentially performed on the electrode positions, so that the experimenter may generate the slippery sensation corresponding to the virtual scene and the pressure in different directions.

The above-mentioned embodiments are preferred embodiments of the present invention, but the embodiments of the present invention are not limited by the above-mentioned embodiments, and any other changes, modifications, substitutions, combinations, simplifications etc. made without departing from the spirit and principle of the present invention, all should be equivalent replacement methods, and they are all included in the protection scope of the present invention.

The invention claimed is:

1. A virtual reality haptic feedback interaction system, characterized in that, comprising:
   a head display module: used to provide a haptic interactive environment in a virtual scene;
   a storage module: connected to the head display module, used to store corresponding relationships between different haptic interaction environments and different haptic feedback parameters; the storage module comprises a corresponding drive circuit to generate different electrical signals characterizing different haptic feedback parameters; the corresponding relationships between the different haptic interaction environments and the different haptic feedback parameters are corresponding relationships between the different electrical signals and the different haptic feedback parameters;
   an electrical stimulation device equipped with multiple electrical stimulation channels: connected to the storage module, used to, according to different electrical signals received, control different frequency and pulse width parameters of current pulses output by each of the electrical stimulation channels as different haptic feedback parameters, and outputs the current pulses to a time-division multiplexing circuit;
   the time-division multiplexing circuit: connected to the electrical stimulation device, used to receive the corresponding current pulses output by the electrical stimulation device, and by selecting and controlling different output channels, an optimal stimulation paradigm for different haptic receptors is obtained; performs time-spatial pulse width and frequency combinations to the corresponding current pulses, and outputs to a flexible electrode array;
   the flexible electrode array: connected to the time-division multiplexing circuit, used to output corresponding electrical stimulation pulses.

2. The virtual reality haptic feedback interaction system according to claim 1, characterized in that, the flexible electrode array comprises a substrate and a plurality of contact electrodes arranged on the substrate, each of the contact electrodes is connected to a corresponding electrical stimulation channel; each of the electrical stimulation channels is controlled by the electrical stimulation device to apply currents of different polarities to different contact electrodes; the electrical stimulation channels are configured to be selectable to activate different contact electrodes to form stimulation electric fields of different shapes on a base of the flexible electrode array, thereby generating stimulation areas of different shapes on the flexible electrode array.

3. The virtual reality haptic feedback interaction system according to claim 2, characterized in that, the contact electrodes of the flexible electrode array are of the same size, and the contact electrodes are arranged in an equally spaced manner.

4. The virtual reality haptic feedback interaction system according to claim 2, characterized in that, the contact electrodes of the flexible electrode array are of different sizes, and the contact electrodes are arranged in a manner of intersecting large and small contact electrodes at equal intervals.

5. The virtual reality haptic feedback interaction system according to claim 2, characterized in that, a surface of the flexible electrode array is covered with a flexible insulating material with electrode perforations, a thickness of the flexible insulating material is not less than 0.5 mm, the electrode perforations are provided on the flexible insulating material, and an area of the electrode perforations is smaller than that of a root of the contact electrodes.

6. The virtual reality haptic feedback interaction system according to claim 2, characterized in that, working modes of the flexible electrode array comprise:
   mode 1: the electrical stimulation device outputs a positive current constant current pulse to the flexible electrode array, and only a single contact electrode outputs electrical stimulation pulses to stimulate a single skin receptor;
   mode 2: the electrical stimulation device outputs multiple positive current constant current pulses to the flexible electrode array, and multiple contact electrodes simultaneously output electrical stimulation pulses to stimulate different skin receptors;
   mode 3: the electrical stimulation device outputs positive current constant current pulses and adjusts the direction of the current through an isolator, changes current weights of the contact electrodes of the flexible electrode array, maintains a principle that a number of positive and negative current electrodes is variable but sums of currents of the positive and negative current electrodes are equal to stimulate different skin receptors.

7. The virtual reality haptic feedback interaction system according to claim 1, characterized in that, the flexible electrode array comprises a substrate made of cloth, and a plurality flexible dry contact electrodes are attached to a surface of the cloth, and the flexible dry contact electrodes are made of flexible conductive fabric materials and are evenly distributed on the entire substrate.

8. The virtual reality haptic feedback interaction system according to claim 7, characterized in that, the flexible dry contact electrodes of the flexible electrode array are of the same size, and the flexible dry contact electrodes are arranged in an equally spaced manner.

9. The virtual reality haptic feedback interaction system according to claim 7, characterized in that, the flexible dry contact electrodes of the flexible electrode array are of different sizes, and the flexible dry contact electrodes are arranged in a manner of intersecting large flexible dry contact electrodes and small flexible dry contact electrodes at equal intervals.

10. The virtual reality haptic feedback interaction system according to claim 7, characterized in that, a surface of the flexible electrode array is covered with a flexible insulating material with electrode perforations, a thickness of the flexible insulating material is not less than 0.5 mm, the electrode perforations are provided on the flexible insulating material, and an area of the electrode perforations is smaller than that of a root of the flexible dry contact electrodes.

11. The virtual reality haptic feedback interaction system according to claim 7, characterized in that, working modes of the flexible electrode array comprise:
   mode 1: the electrical stimulation device outputs a positive current constant current pulse to the flexible electrode array, and only a single contact electrode outputs electrical stimulation pulses to stimulate a single skin receptor;
   mode 2: the electrical stimulation device outputs multiple positive current constant current pulses to the flexible electrode array, and multiple flexible dry contact electrodes simultaneously output electrical stimulation pulses to stimulate different skin receptors;

mode 3: the electrical stimulation device outputs positive current constant current pulses and adjusts the direction of the current through an isolator, changes current weights of the flexible dry contact electrodes of the flexible electrode array, maintains a principle that a number of positive and negative current electrodes is variable but sums of currents of the positive and negative current electrodes are equal to stimulate different skin receptors.

12. The virtual reality haptic feedback interaction system according to claim 1, characterized in that, the time-division multiplexing circuit comprises a time-division multiplexer connected to a time-division demultiplexer; the time-division multiplexer comprises a synchronous rotary switch, which rotates synchronously according to a certain sampling frequency to sequentially sample input signals.

13. The virtual reality haptic feedback interaction system according to claim 1, characterized in that, the electrical stimulation device controls each of the electrical stimulation channels to output corresponding multi-channel current pulses based on different electrical signals, wherein each of the electrical stimulation channels outputs current pulses by changing their current pulse frequency and fixing their pulse width, or by changing their current pulse width and fixing their frequency.

14. The virtual reality haptic feedback interaction system according to claim 13, characterized in that, the current pulses are bipolar positive pulses or bipolar negative pulses.

* * * * *